United States Patent [19]
Hayakawa et al.

(10) Patent No.: US 6,594,107 B2
(45) Date of Patent: Jul. 15, 2003

(54) MAGNETIC DISC APPARATUS HAVING WIRING ON THE OUTER BOTTOM

(75) Inventors: Takako Hayakawa, Odawara (JP); Kouki Uefune, Odawara (JP); Takashi Yamaguchi, Tsuchiura (JP); Shozo Saegusa, Chiyoda (JP); Kyo Akagi, Fucyu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/020,453

(22) Filed: Dec. 18, 2001

(65) Prior Publication Data

US 2003/0016468 A1 Jan. 23, 2003

(30) Foreign Application Priority Data

Jul. 23, 2001 (JP) ........................................ 2001-221578

(51) Int. Cl.[7] ................................................. G11B 5/02
(52) U.S. Cl. .................................................... 360/97.01
(58) Field of Search ......................... 360/97.01, 99.01, 360/900, 63, 264.2; 369/75.1, 77.1; 29/603.03; 361/683, 684, 685

(56) References Cited

U.S. PATENT DOCUMENTS

| 5,282,099 | A | * | 1/1994 | Kawagoe et al. ............ 360/900 |
| 5,299,089 | A | * | 3/1994 | Lwee ............................ 361/684 |
| 5,644,452 | A | * | 7/1997 | Cox et al. .................... 360/264.2 |
| 6,270,375 | B1 | * | 8/2001 | Cox et al. .................... 360/97.01 |
| 6,437,937 | B1 | * | 8/2002 | Guo et al. ........................ 360/63 |

FOREIGN PATENT DOCUMENTS

| JP | 4-111290 | 4/1992 |
| JP | 7-176186 | 7/1995 |
| JP | 8-106761 | 4/1996 |
| JP | 8-115590 | 5/1996 |
| JP | 9-180426 | 7/1997 |
| JP | 11-185371 | 7/1999 |

* cited by examiner

*Primary Examiner*—Hoa T. Nguyen
*Assistant Examiner*—Tianjie Chen
(74) *Attorney, Agent, or Firm*—Mattingly, Stanger & Malur, P.C.

(57) ABSTRACT

The present invention provides a thinner-type magnetic disc apparatus while maintaining the stiffness of the case. The magnetic disc apparatus includes a magnetic disk 100, a spindle motor 109 that rotationally actuates the magnetic disk, a magnetic head 110 that records and reproduces information on the magnetic disk, a carriage 209 with the magnetic head mounted at its tip, a voice coil motor (VCM) 101 that drives the carriage, electronic components 200 and 201 for processing signals from the magnetic head and a case 102 that encloses these structural element. Electrical wiring 108 interconnects the magnetic head and the electronic components or interconnects the electronic components, or both, and is plated onto the inner bottom surface of the case. An interface connecting part 300 is plated onto the outer bottom surface of the case and is connected to electrical wiring that is plated onto the inner bottom and side-wall surfaces of the case. The case 102 is formed as a single unit from a resinous or metal material.

15 Claims, 9 Drawing Sheets

CROSS SECTION OF CONNECTOR JOINT PART

MAGNETIC DISC APPARATUS HAVING WIRING ON THE OUTER BOTTOM

BACKGROUND OF THE INVENTION

1. Field of the Invention

This invention relates to a magnetic disc apparatus and, more particularly, to a thin type of magnetic disc apparatus using a magnetic disk with a small diameter.

2. Description of the Related Art

Not only general-purpose computers and workstations but also personal computers are now equipped with magnetic disc apparatus. As lower-price personal computers have come into wide use, the price of magnetic disc apparatus has fallen remarkably. To offset the lower prices, magnetic recording densities are being increased and the number of disks and heads on magnetic disc apparatus are being reduced to reduce costs. As a result, the storage capacity per unit magnetic disc apparatus has increased.

In this context, the capacities of the magnetic disks used as recording media used in personal computers have been increased to a sufficient degree. On the other hand, the increased capacities of magnetic disc apparatus have allowed huge amounts of information such as motion picture and music data to be handled, so attempts have begun to be made to use magnetic disc apparatus in household electrical information appliances other than personal computers. In particular, demands for diverse applications of magnetic disc apparatus are beginning to grow, as seen in such trends as the use of magnetic disc apparatus to construct databases with massive amounts of information, and the tendency of individual persons to carry these massive amounts of information with them for use at any time and place.

As the magnetic disc apparatus used by individual persons to carry massive amounts of information with them as mentioned above, a magnetic disc apparatus smaller and thinner than the 2.5-inch or 3.5-inch magnetic disc apparatus used in current personal computers is required.

The smaller and thinner size needed for this purpose is achieved in a portable external magnetic disc apparatus as described in JP-A-180426/1997. This portable external magnetic disc apparatus uses a magnetic disk with smaller diameter for lower power consumption and higher portability.

FIG. 8 is a perspective view of a 2.5-inch magnetic disc apparatus mounted on current notebook personal computers. The magnetic disc apparatus shown in FIG. 8 comprises a case 405 and a cover (omitted in FIG. 8) that hermetically enclose the inside; a spindle motor is secured to the case 405. A magnetic disk 400 is attached to the spindle motor by a clamp 406, with a spacer disposed between them. A carriage is provided on the case 405. This carriage has a suspension 402 tipped with a magnetic head 411 for reading and writing information on the magnetic disc 400. In addition, the carriage has a radial degree of freedom with respect to the magnetic disc 400, provided by a pivot 412, and can be driven to a given position on the surface of the magnetic disc 400 by a voice coil motor (VCM) 407 attached to the case 405.

Signals from the magnetic head 411 are transmitted through a flexible printed circuit (FPC) 403 to a pre-amplifier integrated circuit 404 where they are amplified. A further connector (not shown in FIG. 8) conducts the signals to a printed circuit board (PCB) 408 where they are processed by electronic components 409, and the processed signals are transmitted by an external connector 410 to the outside.

The portable compact magnetic disc apparatus, as mentioned above, also has this basic structure, except that it is thinner than the 2.5-inch magnetic disc apparatus. Current 2.5-inch magnetic disc apparatus has a device thickness of 9.5 mm, while the portable compact magnetic disc apparatus has a minimum device thickness of 5.0 mm.

In 2.5-inch magnetic disc apparatus with a device thickness of 9.5 mm, the thickness of the printed circuit board is about 0.6 mm, the ratio of which to the device thickness is about 6.3%. In a portable compact magnetic disc apparatus with a device thickness of 5 mm, the thickness of the printed circuit board is about 0.4 mm, the ratio of which to the device thickness is about 8.0%. It is clear that the portable magnetic disc apparatus has a higher ratio of the board thickness of the printed circuit board 408 to the device thickness as described above.

The prior art includes a structure, disclosed by JP-A-111290/1992, comprising a layer of insulative material that is provided on the internal surface of a case or a cover, and a circuit pattern that is formed on the layer of insulative material for mounting electronic components, thereby reducing the thickness of a magnetic disc apparatus. In another structure, disclosed by JP-A-176186/1995, a layout of electronic components and connectors are electrically connected to a circuit board, a spindle motor and an actuator are secured to the circuit board, and the circuit board is screwed to a cover, thereby reducing the thickness of a magnetic disc apparatus. The art described in JP-A-115590/1996 provides a structure comprising a circuit board with a hole, and a metal base plate that occupies the hole; the metal base plate has holes for securing the spindle motor and actuator, and for components forming connections between the case and the circuit board, thereby reducing the number of components.

Flexible printed circuit connector joining methods used in current magnetic disc apparatus include a structure disclosed in JP-A-106761/1996 and the structure shown in FIG. 9. FIG. 9 is an expanded cross-sectional view through line A—A of an FPC-PCB connector joint part transmitting signals from a magnetic head in the current compact magnetic disc apparatus shown in FIG. 8.

In FIG. 9, the pre-amplifier integrated circuit 500 is soldered to the upper surface of a flexible printed circuit 502 that is connected to the signal-flow path from the magnetic head and supported by a flexible printed circuit plate 501. The flexible printed circuit 502 bends around to the opposite side of the flexible printed circuit plate 501 and is there connected to a flexible printed circuit connector 505. The flexible printed circuit connector 505 transmits magnetic head signals through the case 506 to a printed circuit board 503 outside the case 506. The flexible printed circuit connector 505 makes the signal connections by being pressed against a solder joint part 504 on the printed circuit board 503. As shown in FIG. 9, the case 506 has through-holes for the flexible printed circuit connector 505, around which a packing or sealing substance is used to form a hermetic seal.

For magnetic disc apparatus that uses a flexible printed circuit to provide power and transmit control signals to a spindle motor, the prior art disclosed by JP-A-185371/1999 uses a connector that clamps around the flexible printed circuit, to which it is connected by clamping pressure.

SUMMARY OF THE INVENTION

Therefore, if a basic structure similar to that of current magnetic disc apparatus is adopted, it is necessary to reduce the thickness of the case and the cover still further to achieve the thin size suitable for portable magnetic disc apparatus. The case, however, has a spindle motor, a carriage, and a voice coil motor attached to it, so it must maintain the stiffness needed to support these system components. Therefore, if the case thickness is reduced, it is possible that the case may be unable to maintain the stiffness and may allow vibration which, when transmitted to the outside, causes noise problems. Another possibility is that the cover may be deformed by external forces, and may come in contact with the magnetic disc.

For the printed circuit board, if the board thickness is reduced, stress concentration at the points where electronic components are soldered onto the printed circuit board may warp the printed circuit board. In that case, the problem of faulty connections arises at the place where the connector that transmits signals from the magnetic head to the printed circuit board is joined to the printed circuit board.

In the current structure, described in JP-A-111290/1992 and other patent documents, comprising an integrated molding instead of a printed circuit board separate form the case, the case must have a separate part for attachment of the interface connector, which is a stumbling block for achieving thin size of the apparatus. In the art described in the document above, it is specified that a printed circuit board having electronic components mounted be provided inside the case, so the structure requires adding a separate interface connector for connection from the connector ends of the printed circuit board inside the case to the outside. The drawing attached to this patent document shows an interface part 25 as a separate structural element of a printed circuit board inside the case. Therefore, it is necessary to provide a connector mechanism for interconnecting the printed circuit board and the interface part, which mechanism becomes a possible source of faulty connections.

It is therefore a first object of the present invention to provide a thinner type of magnetic disc apparatus by placing electrical wiring patterns on the case, thereby implementing the functions of a printed circuit board corresponding to those of the prior art, instead of providing a printed circuit board as a discrete part, separate from the case, as in the prior art, and, regarding the interface part providing external connections for the magnetic disc apparatus, by providing printed wiring on the case to implement the interface function, while maintaining required stiffness of the case.

If the basic structure of current magnetic disc apparatus is used to achieve smaller and thinner size for portable magnetic disc apparatus, there is a possibility that it may become impossible to provide adequate room to connect a flexible printed circuit connector to electrical wiring inside the magnetic disc apparatus. If there is not adequate room, redesigning is necessary to make the connector that has been used in the current magnetic disc apparatus thinner and more compact. In this case, custom design is required every time the outer dimensions of the magnetic disc apparatus are changed, resulting in increased cost. At the same time, since making a connector smaller and thinner reduces the area of contact with the flexible printed circuit, thus reducing the pressing force on the flexible printed circuit, there is a possibility that the connector may become more easily disconnected, causing faulty connections.

It is therefore a second object of the present invention to make magnetic disc apparatus smaller and thinner and more reliable by directly connecting the end part of the flexible printed circuit in the magnetic disc apparatus to the ends of the electrical wiring in the case.

In order to solve the problems described above, the present invention provides the following structures.

Magnetic disc apparatus comprising: a magnetic disk; a spindle motor that rotationally actuates the magnetic disk; a magnetic head that records and reproduces information on the magnetic disk; a carriage having the magnetic head at its tip; a voice control motor that drives the carriage; electronic components for processing signals from the magnetic head; a case on which these components are mounted; electrical wiring that interconnects the magnetic head and the electronic components or interconnects the electronic components, or both, and is integrated with the case; and an interface connector part, also integrated with the case, that transmits signals processed by the electronic components to the outside.

Magnetic disc apparatus comprising: a magnetic disk; a spindle motor that rotationally actuates the magnetic disk; a magnetic head that records and reproduces information on the magnetic disk; a carriage having the magnetic head at its tip; a voice coil motor that drives the carriage; electronic components for processing signals from the magnetic head; a case on which these components are mounted; electrical wiring that interconnects the magnetic head and the electronic components or interconnects the electronic components, or both, and is plated onto the inner bottom surface of the case; and an interface connecting part plated onto the outer bottom surface of the case that is connected to the electrical wiring plated onto the inner bottom and side-wall surfaces of the case.

Magnetic disc apparatus, wherein: the case is made of an insulative resin material and is formed as a single unit;

the electrical wiring that connects the electronic components in the magnetic disc apparatus is plated onto the inner bottom and side-wall surfaces of the case and is thereby integrated with the case; and the interface connecting part that provides external connections for the magnetic disc apparatus is plated onto the outer bottom surface of the case and is integrated with the case; thus the case serves as a structural element also offering an interface function, capable of contributing to still thinner size and stabilized operation and providing adequate fitness-for-use regarding vibration characteristics and stiffness as a product.

DETAILED DESCRIPTION OF THE PREFERRED EMBODIMENTS

Figure 1:
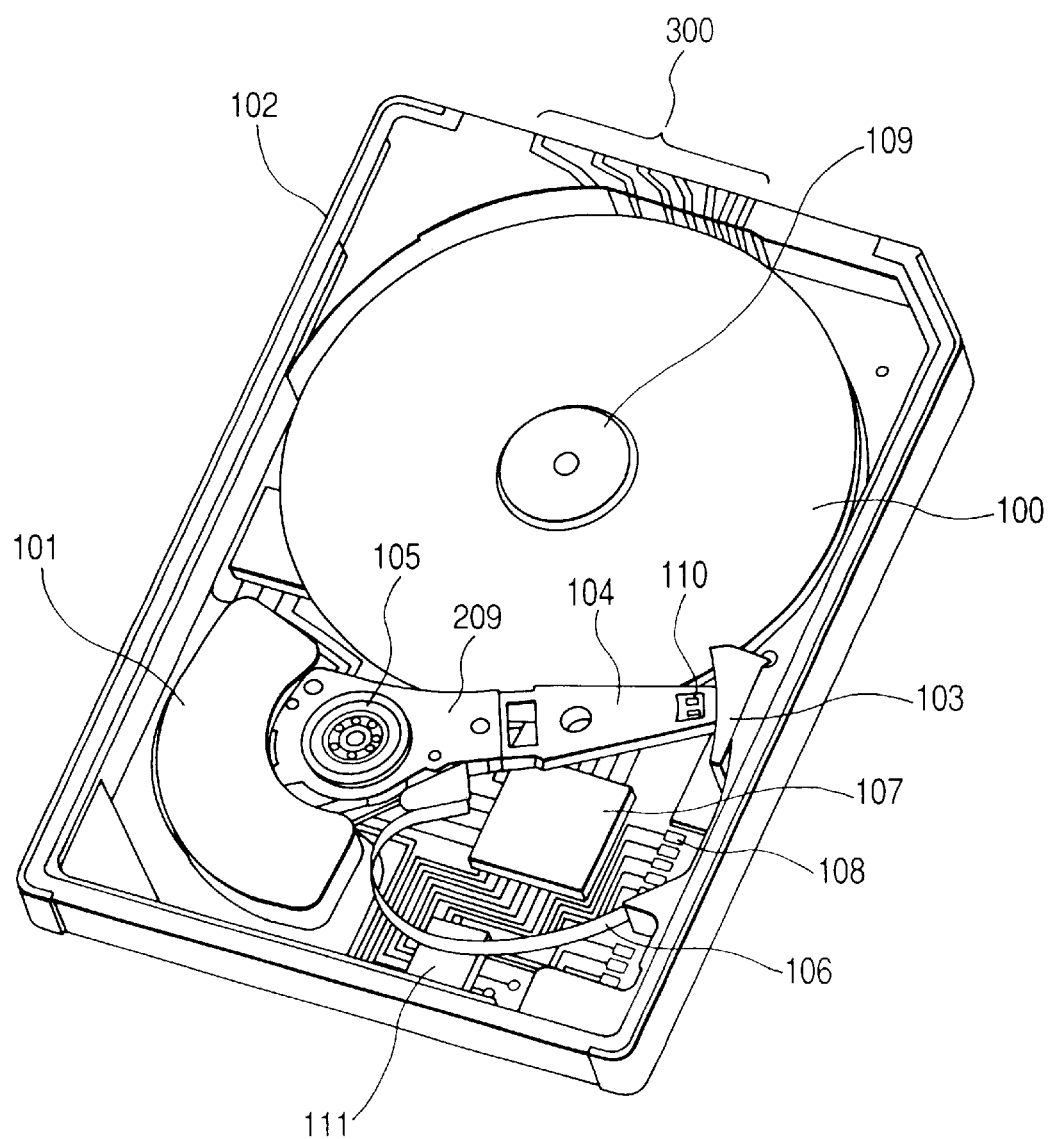
FIG. 1 is a perspective view of the internal structure of a small, thin magnetic disc apparatus according to a first embodiment of the present invention.

A magnetic disc apparatus according to the first embodiment of the present invention will be described with reference to FIGS. 1 to 3. FIG. 1 is a perspective view of the internal structure of a small, thin type magnetic disc apparatus according to the first embodiment of the present invention. FIG. 2 is a drawing showing electrical wiring on the inner bottom and side-wall surfaces of the case in the magnetic disc apparatus according to the first embodiment of the present invention. FIG. 3 is a drawing showing electrical wiring on the outer bottom surface of the case of the magnetic disc apparatus according to the first embodiment of the present invention.

In FIG. 1, a spindle motor 109 is secured to a case 102 by mechanical injection or bonding. A magnetic disk 100 is secured to the spindle motor 109 by clamping or bonding. A carriage 209 is provided on the case 102. The carriage 209 has a pair of suspensions 104 tipped with magnetic heads 110 for reading and writing information on the magnetic disk 100. The carriage 209 has a radial degree of freedom with respect to the magnetic disk 100, this freedom being afforded by a pivot 105, and can be driven to a given position on the surface of the magnetic disk 100 by a voice coil motor 101 that is secured to the case 102.

Figure 8:
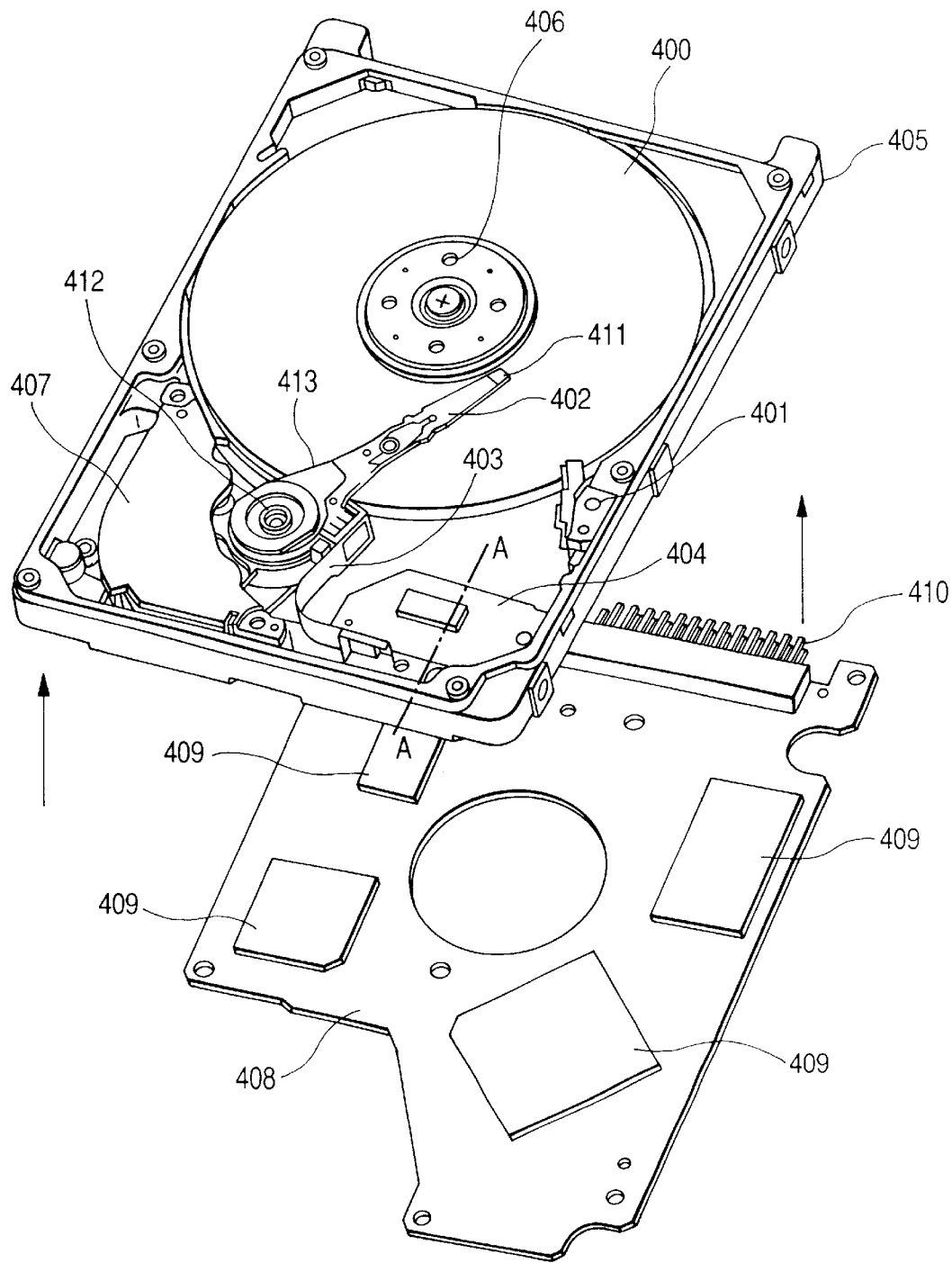
FIG. 8 is a perspective view of the internal structure of a magnetic disc apparatus according to prior art.

Electrical wiring 108 is printed directly on the surface of the case 102. Signals from the magnetic heads 110 are transmitted to the electrical wiring 108 on the surface of the case 102 through a flexible printed circuit 106. Signals that have been processed by electronic components provided in the case 102 are transmitted to data transmission wiring 300 at an external connecting part (also referred to as an interface connecting part) unitarily integrated with the case 102, and are outputted to the outside. Electronic components required for processing signals from the magnetic heads 110 are integrally mounted in the case 102 (the details of the electrical wiring will be described later). A cover (omitted in FIG. 1) is secured to the case 102 for enclosure thereof. In this way, the functions of the printed circuit board 408 shown in FIG. 8 are provided by the case 102, so the thickness of the apparatus can be reduced by amount equivalent to the thickness of the printed circuit board.

Figure 2B:
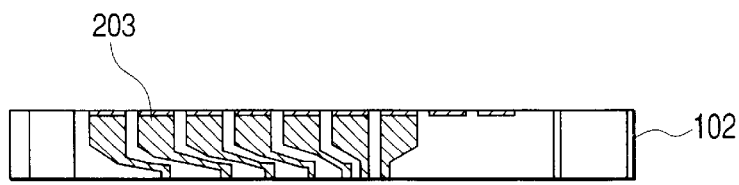
FIGS. 2(*a*)–2(*c*) are drawings showing electrical wiring on the inner bottom and side-wall surfaces of the case in the magnetic disc apparatus according to the first embodiment of the present invention.
Figure 2A:
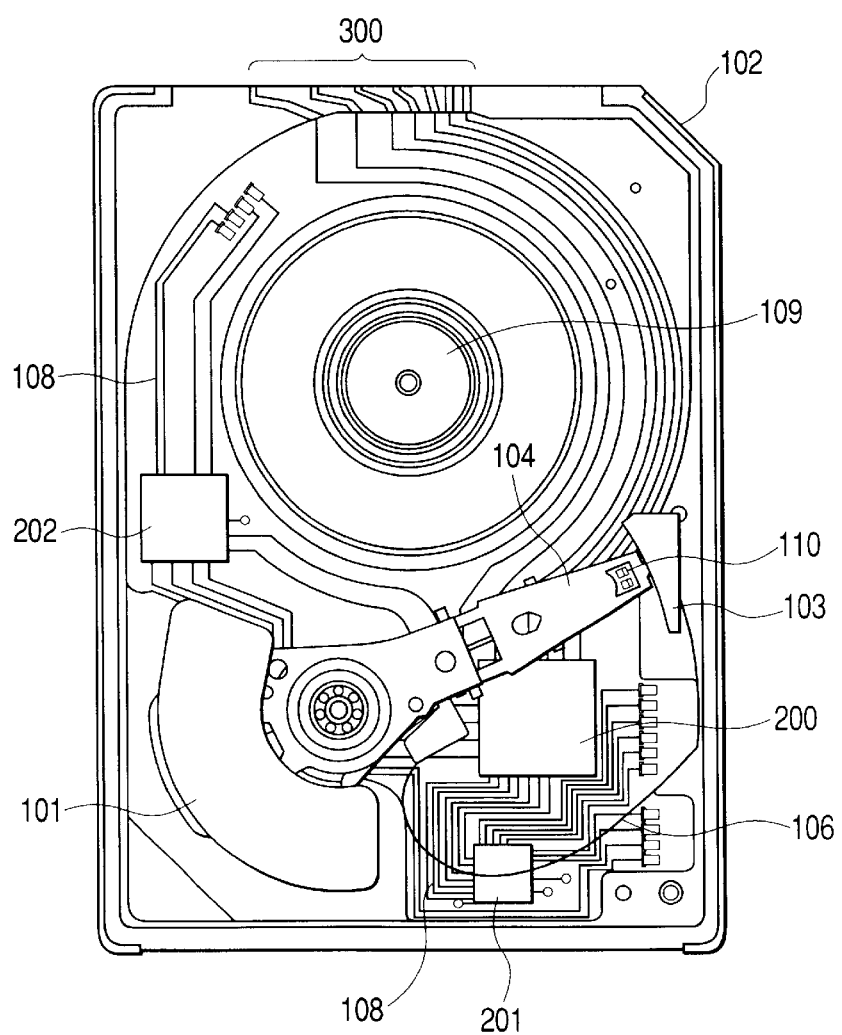
Figure 2C:
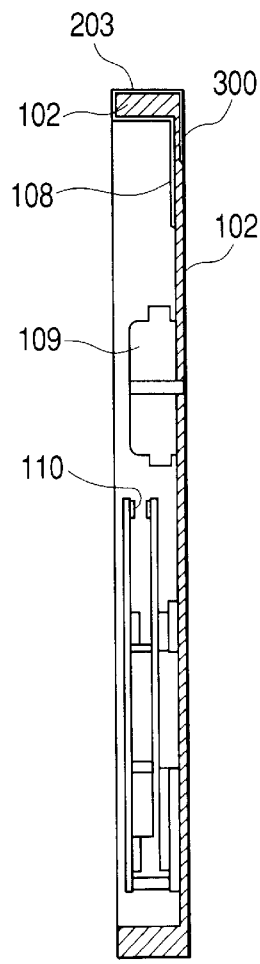
Figure 3:
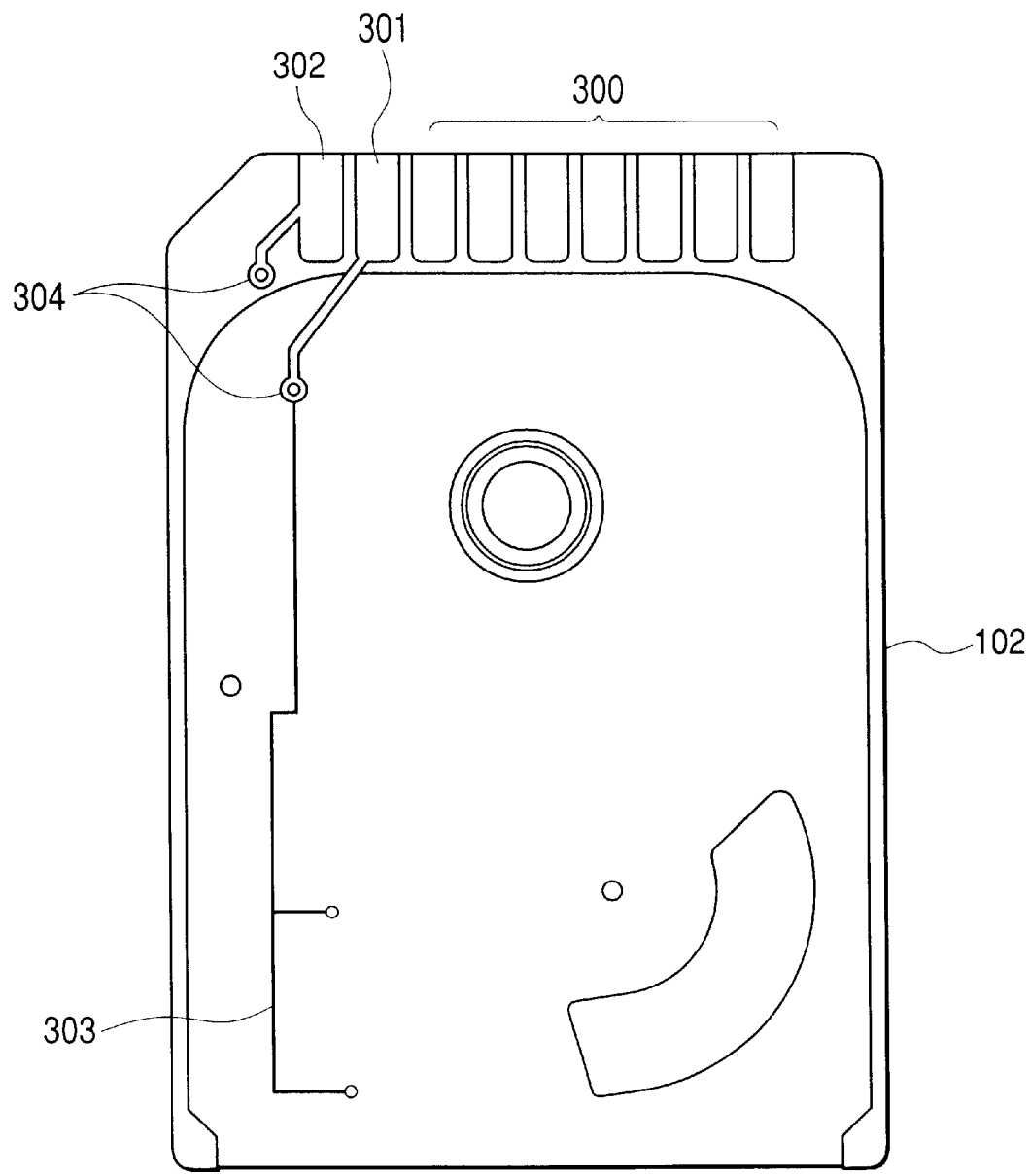
FIG. 3 is a drawing showing electrical wiring on the outer bottom (backside) surface of the case of the magnetic disc apparatus according to the first embodiment of the present invention.

In FIGS. 2(a)–2(c), FIG. 2(a) is a plan view showing electrical wiring on the inner bottom surface of the case 102 of the magnetic disc apparatus; FIG. 2(b) is a drawing showing electrical wiring on the inner side-wall surface that is connected to interface connecting parts 300, 301, and 302 (the external connecting parts shown in FIG. 3), which are provided on the outer bottom surface of the case, seen from the outside of the case; and FIG. 2(c) is a cross-sectional view through line C—C in FIG. 2(a). The electrical wiring 108 that is directly printed on the surface of the case 102 in FIG. 2(a) will be described in detail below.

Signals from the two magnetic heads 110 are transmitted to the electrical wiring 108 through the flexible printed circuit 106. The signals are transmitted from the pre-amplifier integrated circuit 201 through the electrical wiring 108 to a hard disc controller (HDC) 200 for signal processing. The voice coil motor 101 and the spindle motor 109 are driven and controlled by a combination driver IC (a combination driver for a voice coil motor and spindle motor) 202 through the electrical wiring 108. The electrical wiring 108, as shown in FIG. 2(b), is connected to electrical wiring 203 printed on the inner side-wall surface of the case 102, and then, as shown in FIG. 2(c), through further electrical wiring (the interface connecting parts 300, 301, and 302) to the outside. That is, as shown in FIG. 2(c), the printed wiring in the interface connecting parts 300, 301, and 302 formed on the outer bottom surface of the case 102 forms the external interface connecting parts of the case 102.

The case 102 is composed of an insulative resin material, on which electrical wiring is formed directly by plating or sputtering processing to provide a printed wiring structure.

FIG. 3 is a drawing showing the electrical wiring at the interface connecting parts (external connecting parts) on the outer bottom surface of the case 102 of the magnetic disc apparatus. Nine terminals of the interface connecting parts 300, 301, and 302 are unitarily formed on the outer bottom surface of the case 102, and the connecting parts are printed directly on the case 102, which is composed of a resin material, by plating and etching. In the interface connecting parts, reference numeral 300 indicates a data transmission connecting part, reference numeral 301 indicates a ground connecting part, and reference numeral 302 indicates a power connecting part.

For the interface connecting parts of the magnetic disc apparatus, it is expected that the ATA (AT Attachment) interface standard that is currently applied will be replaced with the serial ATA standard, the SPI (SCSI Parallel Interface) standard, or other standards in future. In the case of such a change in standards, the present invention is also effective in point of easy compliance with newly adopted interface standards. Since a serial interface connector has fewer connecting terminals, the integrated molding interface connection structure printed by plating and etching processing as shown in FIG. 3 becomes particularly favorable for production. Compared to about fifty connecting terminals in the ATA standard, the number of connecting terminals of a serial interface is about ten, so the area of the connecting part devoted to each connecting terminal can be enlarged, resulting in easier production and lower probability of faulty connections.

In this embodiment, as a method of providing power from the terminal of the power connecting part 302, the case 102 is penetrated by a through hole 304, the interior of which is plated with a conductive substance to pass electric current. As shown in FIG. 2(a), power is applied to the electronic components provided on the inner bottom surface of the case 102 via the through hole 304. The terminal of the ground connecting part 301 provides ground paths to the electronic components through electrical wiring 303 on the outer bottom surface of the case 102 and via another through hole 304 in the case 102. In this way, by connecting the data transmission connecting part 300 through the inner side-wall surface of the case to the inner bottom surface of the case, and by connecting the ground and power connecting parts 301 and 302 via through holes 304 to the inner bottom surface of the case, the data transmission wiring can be protected from signal interference from the power wiring.

The outer bottom surface of the case 102 is covered and shielded with an insulating seal (omitted in FIGS. 1 to 3) for isolation from the outside and to prevent short circuits. A further seal attached to the cover and wrapping around the case 102 can seal the inside of the magnetic disc apparatus hermetically. Packing can be also provided between the junction of the cover and the case 102 to seal the inside of the magnetic disc apparatus hermetically.

The description above shows that the first embodiment of the present invention patterns electrical wiring and interface connecting parts directly on the inner bottom, inner sidewall, and outer bottom surfaces of a unitary case composed of an insulative resin material, thereby making it possible to achieve a magnetic disc apparatus with a smaller and thinner size and improved operational reliability. This embodiment is also effective in regard to vibration characteristics and stiffness, as will be described below.

In a specific example of the first embodiment of the present invention, the case for a 1-inch hard disk drive (HDD) is made of a resinous material and has outer dimensions of 42.8×36.4×5 mm, a Young's modulus E of 800 kg/m$^2$, and an eigen frequency f of 687 Hz. A case for a 2.5-inch HDD has outer dimensions of 70×100×9.5 mm, and if it is an aluminum die cast case, then Young's modulus E is 6500 kg/m$^2$, and the eigen frequency f is 700 Hz; if the case is made of a resin material, Young's modulus E is 800 kg/m$^2$, and the eigen frequency f is 245 Hz; an eigen frequency of 600 Hz or higher is specified as an oscillation-resistance characteristic standard to which a magnetic disc apparatus should conform.

Given these conditions, a 2.5-inch HDD of a resin material case cannot meet the eigen frequency standard, while the 1-inch HDD of the smaller and thinner resin material case according to this embodiment can meet the eigen frequency standard. In regard to stiffness, for a 1-inch HDD case with specified length, width, and height dimensions, it is well known that, compared to the combined board of the prior art in which a printed circuit board and a mounting board for a spindle motor, a disk, and other structural elements are combined, a single board with substantially the same thickness as the combined board, as in the case of this embodiment, is more stiff, and a Young's modulus E of 800 kg/m$^2$ can be said to be adequate for practical use.

Consequently, the structure of electrical wiring and interface connecting parts integrated into a case composed of a resin material according to this embodiment is also suitable for production in regard to vibration characteristics and stiffness. If a case according to this embodiment is composed of metal material coated with resin material, instead of being composed of resin material as described above, the stiffness becomes still higher and the impact-resistance characteristics are improved.

As described above, the first embodiment of the present invention comprises a structure in which the functions of a printed circuit board that is conventionally separate from the case are implemented on a case without a separate printed circuit board, thereby achieving a thickness reduction equivalent to the thickness of the printed circuit board; the electrical wiring interconnecting electronic components for signal processing is integrated into the case as printed wiring, and the interface connecting parts that provide external connections for the magnetic disc apparatus are also integrated into the case, so the case serves interface functions, thereby achieving still thinner size and operational stabilization; the first embodiment also provides a magnetic disc apparatus with adequate fitness-for-use regarding vibration characteristics and stiffness as a product; these are the main characteristics of the first embodiment of the present invention.

Figure 4:
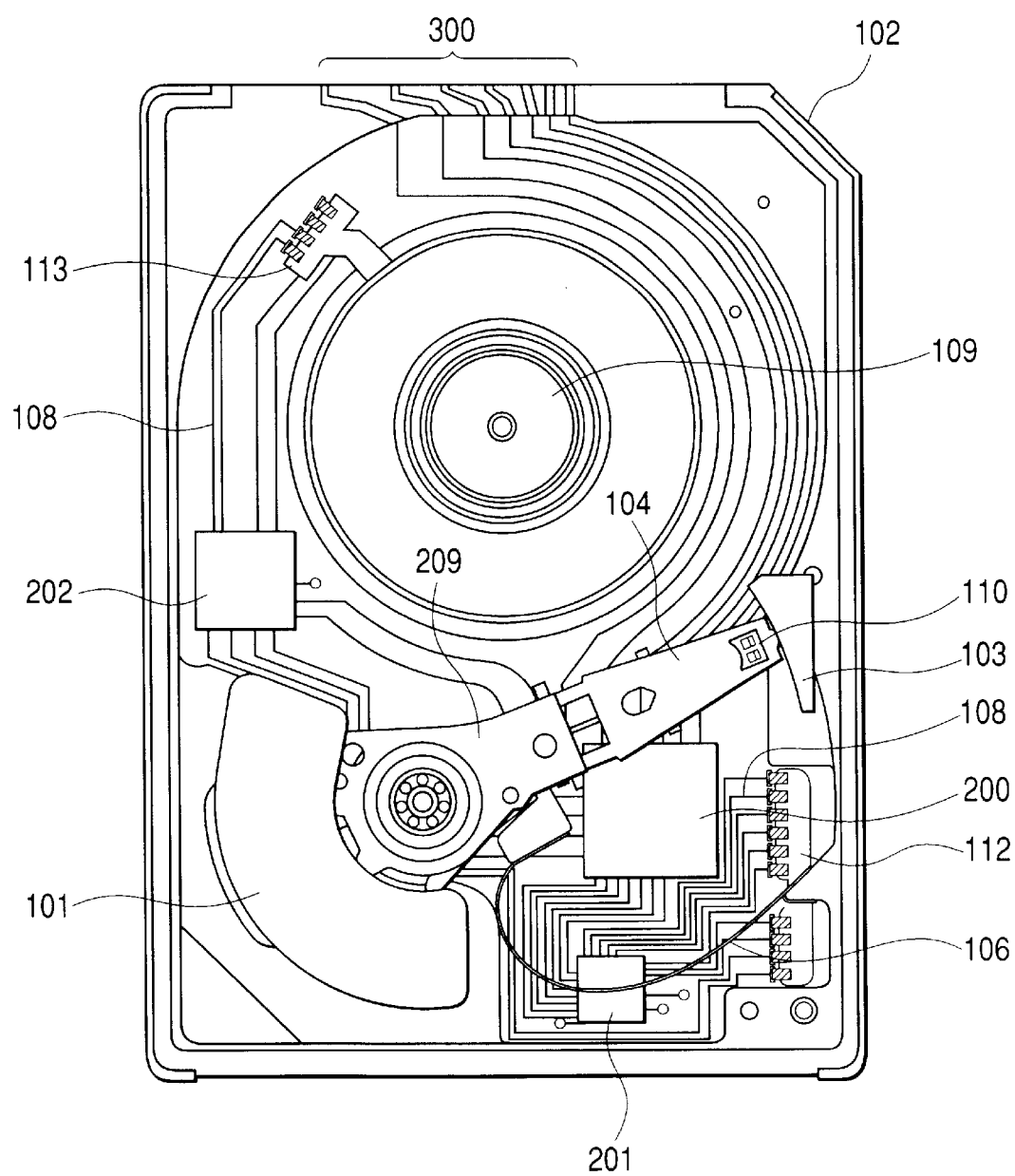
FIG. 4 is a plan view of the internal structure of a small, thin magnetic disc apparatus according to a second embodiment of the present invention.
Figure 5:
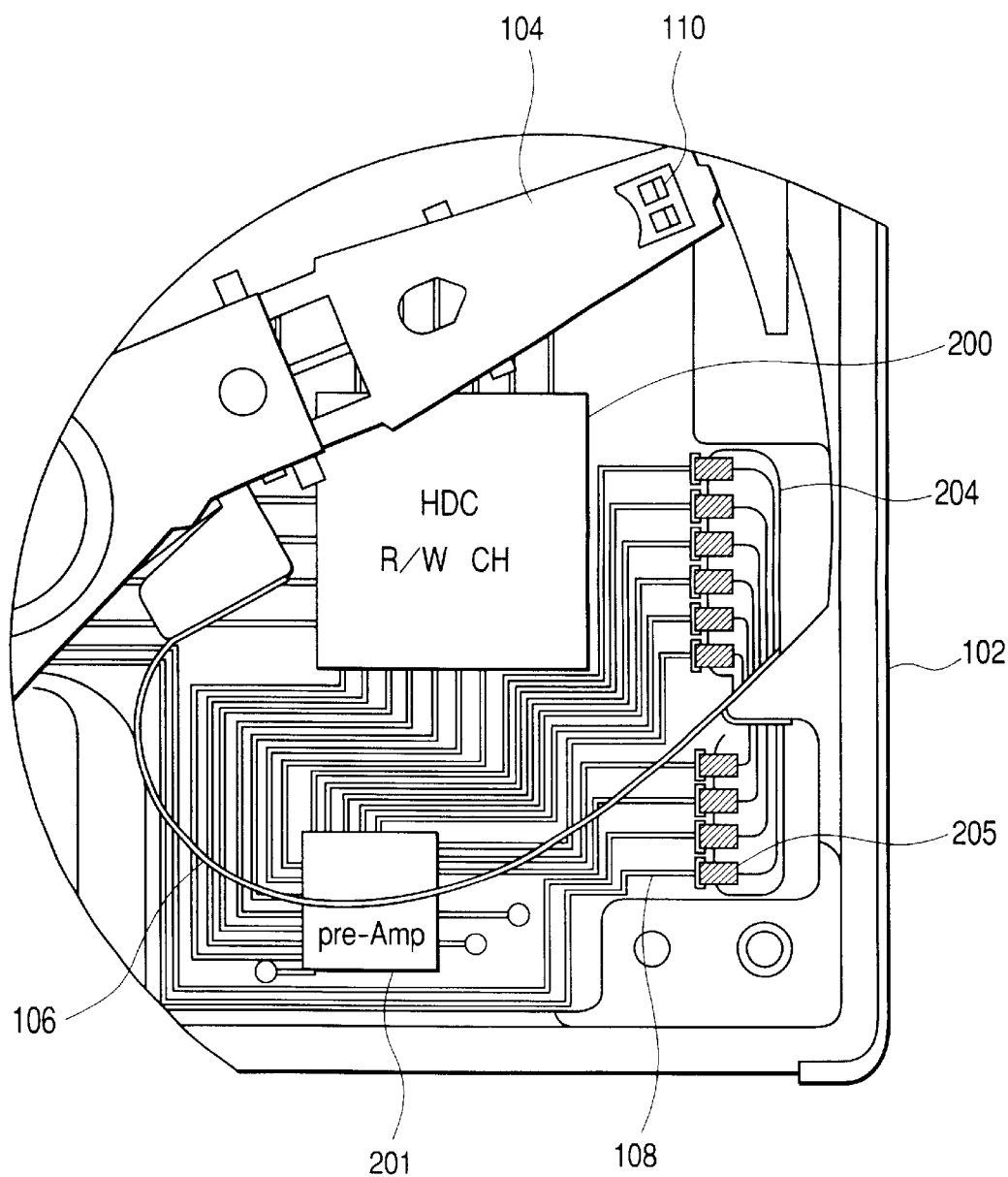
FIG. 5 is an expanded view of the interconnecting part of a flexible printed circuit that performs transmission of signals from a magnetic head in the magnetic disc apparatus according to the second embodiment of the present invention.
Figure 6:
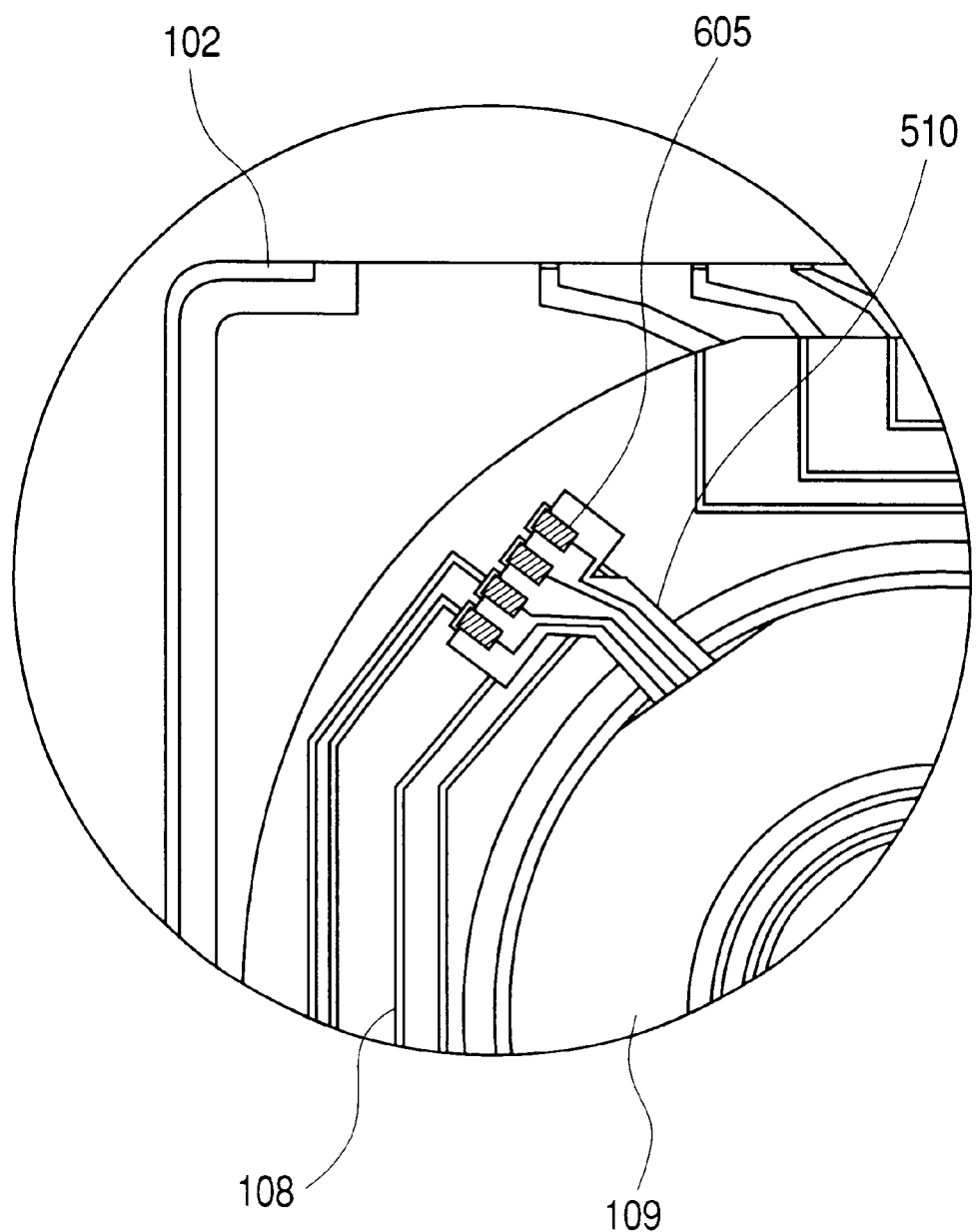
FIG. 6 is an expanded view of the joint part of a flexible printed circuit that provides control and power to a spindle motor in the magnetic disc apparatus according to the second embodiment of the present invention.
Figure 7:
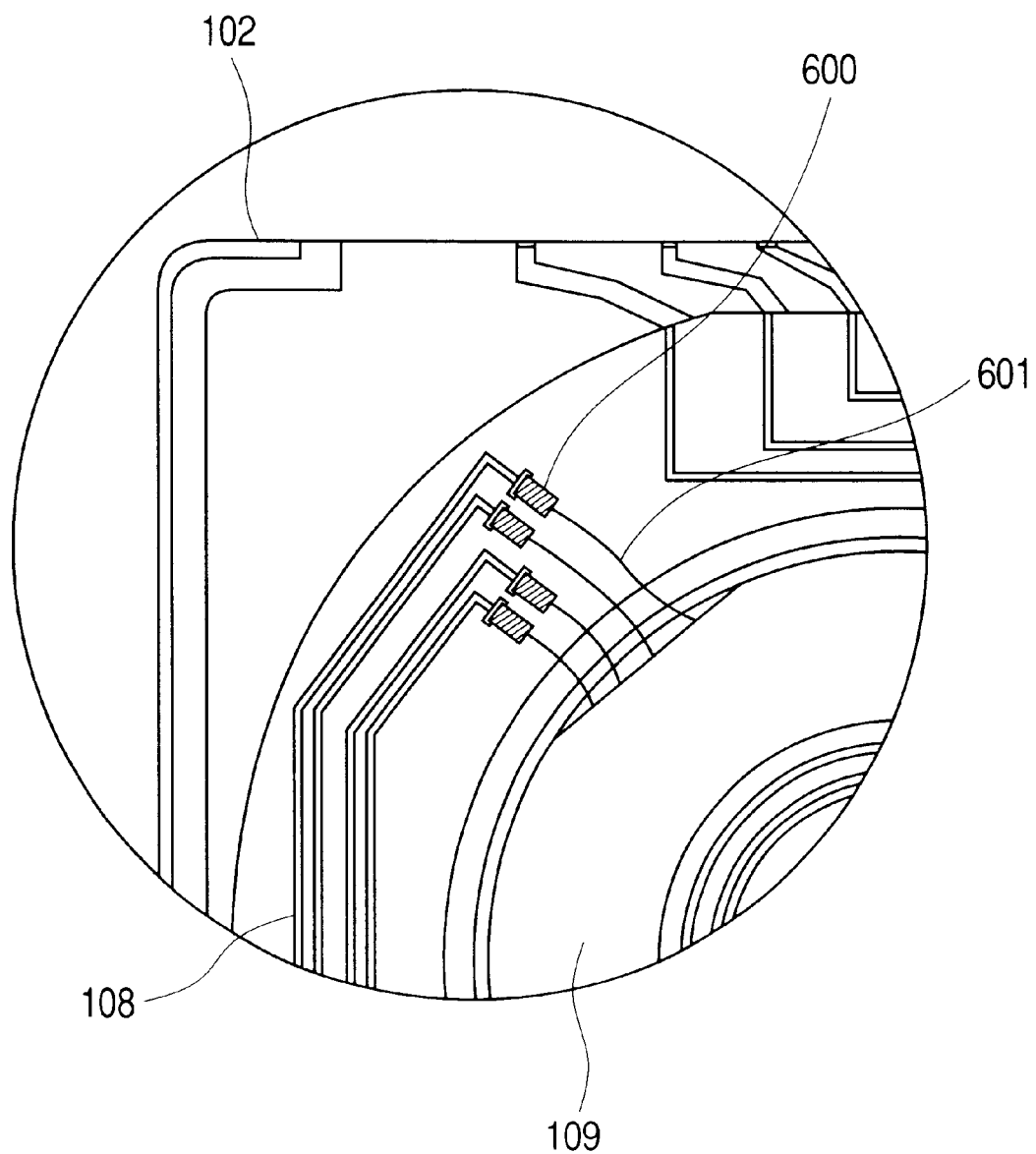
FIG. 7 is an expanded view of the interconnecting part of conductors for providing control and power to a spindle motor in the magnetic disc apparatus according to the second embodiment of the present invention.

Next, a magnetic disc apparatus according to a second embodiment of the present invention will be described with reference to FIGS. 4 to 7. FIG. 4 is a plan view of the inner structure of a smaller and thinner magnetic disc apparatus according to the second embodiment of the present invention. FIG. 5 is an expanded view of the connecting part of a flexible printed circuit that transmits signals from the magnetic heads in the magnetic disc apparatus according to the second embodiment of the present invention; FIG. 6 is an expanded view of the connecting part of a flexible printed circuit that provides control and power to a spindle motor in the magnetic disc apparatus according to the second embodiment of the present invention; and FIG. 7 is an expanded view of the connecting part of the conductive wires that provide control and power to the spindle motor in the magnetic disc apparatus according to the second embodiment of the present invention.

Electrical wiring 108 that is directly printed on the surface of the case 102 in the magnetic disc apparatus will be described in detail with reference to FIG. 4. Signals from the two magnetic heads 110 are transmitted through a flexible printed circuit 106 to the connecting ends of the electrical wiring 108, and further transmitted through the electrical wiring 108 to the pre-amplifier integrated circuit 201, then to the hard disk controller 200 for processing. The voice coil motor 101 and spindle motor 109 are also driven and controlled by combination drive IC 202 through the electrical wiring 108. The electrical wiring 108 is connected to the outside through electrical wiring printed on the inner sidewall surface of the case 102 (refer to FIG. 2(b)) and data transmission wiring 300 of the external connecting part (interface connecting part) printed on the outer bottom surface of the case 102. The electrical wiring is printed on the case 102 by plating and etching processing after the case 102 is resin-molded.

The spindle motor 109 is secured to the case 102 by mechanical gripping pressure or bonding; the magnetic disk (omitted in FIG. 4) is secured to the spindle motor 109 by clamping or bonding. A carriage 209 is mounted on the case 102; the carriage has a pair of suspensions 104 tipped with the magnetic heads 110 for reading and writing information on the magnetic disk 100. The carriage 209 has a radial degree of freedom with respect to the magnetic disk 100, this freedom being afforded by a pivot 105, and can be driven to a given position on the surface of the magnetic disk 100 by the voice coil motor 101 that is secured to the case 102.

FIG. 5 is an expanded view of the connecting part of a flexible printed circuit for transmitting signals from the magnetic heads of the magnetic disc apparatus shown in FIG. 4. A hard disk controller IC 200 and a pre-amplifier integrated circuit 201 are directly secured to the case 102, on which electrical wiring 108 is printed for interconnection thereof. The flexible printed circuit 106 that transmits electrical signals from the magnetic heads 110 is bonded to the suspensions 104; the connecting end 204 of the flexible printed circuit 106 is connected to the connecting ends of the electrical wiring 108 by solder joints 205.

FIG. 6 is an expanded view of the connecting part of a conductive wire 601 on a flexible printed circuit that provides control and power to the spindle motor in the magnetic disc apparatus according to the second embodiment of the present invention shown in FIG. 4. The spindle motor 109 is secured to the case 102 by mechanical injection or bonding; a flexible printed circuit 510 that provides power and receives control signals is connected to conductive wires from the motor part of the spindle motor 109. The flexible printed circuit 510 is soldered to the connecting ends of the electrical wiring on the case 102 at solder joints 605.

FIG. 7 is an expanded view of the connecting part of a conductive wire 601 for providing control or power to a spindle motor (in a transmission form different from that for the flexible printed circuit 510) in the magnetic disc apparatus according to the present invention, shown in FIG. 4. The spindle motor 109 is secured to the case 102 by mechanical injection or bonding; and conductive wires 601 for receiving power and control signals extend from the motor part of the spindle motor 109 to the inside the case 102. The ends of the conductive wires 601 are soldered to the connecting ends of a trace in the electrical wiring on the case 102 at solder joints 600.

The forming of the case of the magnetic disc apparatus according to the first and second embodiments of the present invention will now be described. The case in these embodiments is formed from an insulative resin material by molding or machine working. Therefore, when the mold that determines the shape of the case is formed, it includes the shapes of holes for mounting the spindle motor 109, the actuator, and the voice coil motor 101, and the interface connecting parts 300, 301, and 302 for transmitting signals to the outside. After the case is molded from a type of resin material, the finer parts are formed; the electrical wiring patterns are formed by plating or sputtering processing; and the interface connecting part is also formed by plating or sputtering.

The interface connecting parts according to this embodiment are composed of the same material as that for a case, and are not installed on the case after molding of the case but are integrally formed when the case is molded, so it is possible to reduce the number of the assembly steps. As described above, the case is an integrated molding of a resin material; a resin material such as poly-phthal-amide (PPA), liquid-crystal-polymer (LCP), or the like, which allows plating processing on the surface thereof, is used.

Alternatively, the case may comprise a forged, cast, or machine-worked metal material (and if the surface of the metal material is covered with resin material, it can be molded in the shape of the case by using the metal mold used for forging or casting). After that, the fine details are worked, and the surface of the case is coated with insulative resinous material. Plating processing is carried out for the electrical wiring patterns and interface connecting part patterns on the inner bottom, inner side-wall, and outer bottom surfaces of the case after it is coated with the resin material.

Figure 9:
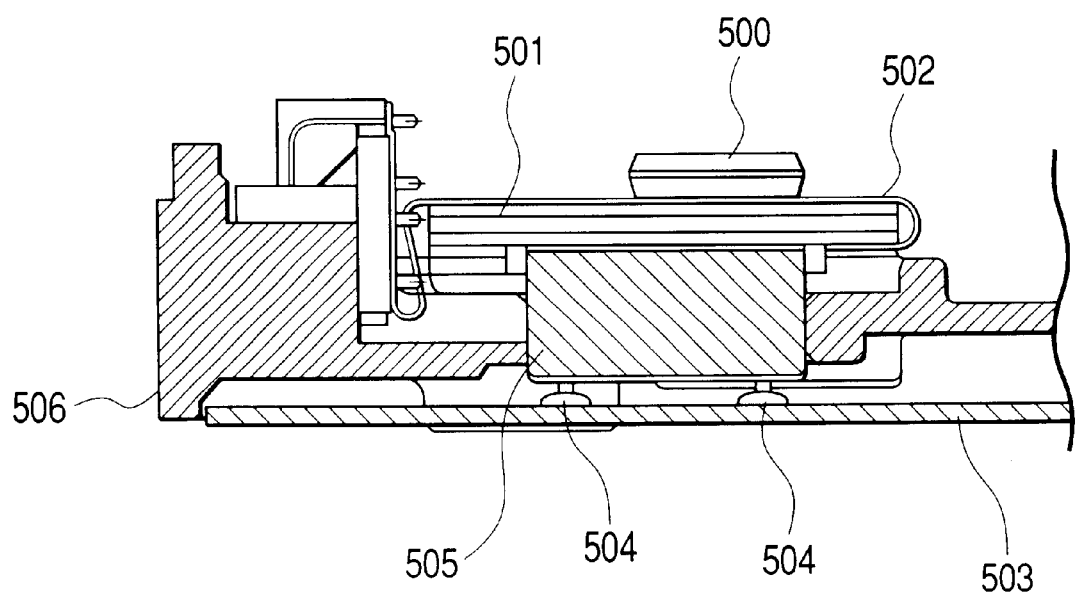
FIG. 9 is an expanded sectional view through line A—A in FIG. 8, showing the interconnecting part of a flexible printed circuit and printed circuit board that perform transmission of magnetic head signals in the magnetic disc apparatus according the prior art.

As described above, regarding the interconnection of a flexible printed circuit and electrical wiring providing links among electronic components, the second embodiment of the present invention directly solders the connecting ends of the flexible wiring and the electrical wiring, thereby eliminating the need for flexible printed circuit connectors and the need for an enclosure made hermetic with seals or packing in prior art (refer to FIG. 9), achieving a thinner size, and contributing to more stable operation (being capable of preventing faulty connections caused by external impact and the entry of dirt); these are the main features of the second embodiment of the present invention.

As described above, the embodiments of the present invention include elements comprising the following structures and providing the following functions or effects:

A magnetic disc apparatus according to one embodiment comprises a case 102 having within it a spindle motor 109 that rotationally actuates an attached magnetic disk 100; a carriage 209 having a pair of suspensions 104 tipped with magnetic heads 110; and a voice coil motor 101 that drives the carriage 209. The inside structure of the case 102 is hermetically enclosed by a cover. The case 102 houses a pre-amplifier integrated circuit 201, a hard disk controller integrated circuit 200, and other electronic components; electrical wiring 108 that interconnects these electrical components is printed integrally on the surface of the case. In addition, interface connecting parts 300, 301, and 302 for sending and receiving signals between the magnetic disc apparatus and the outside world are integrally printed on the surface of the case. This enables the space occupied by a printed circuit board in a conventional structure to be distributed among other elements in the magnetic disc apparatus, allowing effective use of the space inside the case while the stiffness of the case and cover is maintained, and resulting in reduced thickness of the magnetic disc apparatus. In addition, interface connectors are integrally molded with the case, whereby the need for secondary connector parts can be eliminated, resulting in lowered cost.

The case 102 is formed from an insulative resin material by either molding or working; alternatively, it may be formed from a metal material by forging, casting, or working, or from a metal material the surface of which is coated with insulative resin material. The weight of the magnetic disc apparatus can be reduced in this way.

The hermeticity is assured by sealing the junction of the case 102 and the cover with a sealing material. Alternatively, a packing material can be used at the junction of the case and cover for hermeticity. This makes it possible to provide a hermetically sealed magnetic disc apparatus easily and with no increase in the thickness of the apparatus, resulting in a magnetic disc apparatus with reduced thickness.

A magnetic disc apparatus according to another embodiment comprises: a case 102 having within it a spindle motor 109 that rotationally actuates an attached magnetic disc 100; a carriage 209 having a suspension 104 with a magnetic head 110 at its tip; and a voice coil motor 101 that rotationally actuates the carriage 209. The inside structure of the case 102 is hermetically enclosed by a cover. The case 102 houses a pre-amplifier integrated circuit 201, a hard disk controller IC 200, and other electronic components; electrical wiring 108 that interconnects these electrical components is printed integrally on the surface of the case. In addition, interface connecting parts 300, 301, and 302 for sending and receiving signals between the magnetic disc apparatus and the outside world are integrally printed on the outer bottom surface of the case. In addition, in this embodiment, the connecting ends of electrical wiring in a flexible printed circuit 106 and the connecting ends of electrical wiring provided on the case 102 are directly interconnected by solder joints 205. This enables space to be saved inside a downsized magnetic disc apparatus, eliminates the need for connectors, thereby enabling effective use of the mounting space in the thickness direction of the magnetic disc apparatus, and reduces the thickness of the magnetic disc apparatus. The soldered joints can prevent impact from causing poor contacts or disconnections.

In this embodiment, all of the electrical wiring 108 is located inside the case, except for the external connecting parts 300, 301, and 302, which are located on the outer bottom surface of the case, and the printed circuits are directly connected to the electrical wiring 108 without using connectors; this embodiment, accordingly, has fewer problems with dirt than in the structure of the prior art, in which electrical connections are made between the case and a printed circuit board through connectors that must be hermetically sealed separately.

In addition, when power and control signals are transmitted to the spindle motor 109 and electronic components through a flexible printed circuit 510 in a magnetic disc apparatus, the electrical wiring ends on the flexible printed circuit are directly soldered to the connecting ends of electrical wiring provided on the case, which enables downsizing and thickness reduction of the magnetic disc apparatus.

Adopting the structure shown in this embodiment makes it possible to reduce the device thickness of a magnetic disc apparatus (HDD) to 4 mm or less.

As described above, the present invention comprises a structure in which electrical wiring that interconnects electronic components in a magnetic disc apparatus is integrated with the case by being plated on the inner bottom and side-wall surfaces thereof, and interface connecting parts that provide external connections for the magnetic disc apparatus are integrated with the case by being plated onto the outer bottom surface of the case, whereby the case is also given interface functions, eliminating the need for the interface connectors and printed circuit board that exist in conventional magnetic disc apparatus, resulting in a reduced number of parts. Therefore, further thickness reduction and stabilization of operation can be achieved, and a magnetic disc apparatus with adequate fitness-for-use regarding vibration characteristics and stiffness as a product can be provided.

Regarding the connections between flexible printed circuits linked to the magnetic head actuator and spindle motor and electrical wiring interconnecting electronic components, the present invention solders the connecting ends of the flexible printed circuits and electrical wiring directly, thereby eliminating the need for the flexible printed circuit connectors and spindle-motor connector that exist in conventional magnetic disc apparatus, consequently making it possible to reduce the number of parts. Therefore, further thickness reduction as well as operational stabilization (no faulty connections caused by external impact and the entry of dirt) can be achieved.

What is claimed is:

1. A magnetic disc apparatus comprising:
    a magnetic disk;
    a spindle motor that rotationally drives the magnetic disk;
    a magnetic head that records and reproduces information on the magnetic disk;
    a carriage having the magnetic head at its tip;
    a voice coil motor (VCM) that drives the carriage;
    a signal processing circuit that processes signals from the magnetic head;
    a case on which these components are mounted;
    an electrical wiring that interconnects the magnetic head and the signal processing circuit, and/or interconnects the signal processing circuits and is unitary with the case; and
    an interface connecting part that transmits signals that were processed by the signal processing circuit to the outside and is unitary with the case and comprises a data transmission connecting part, a ground connecting part, and a power connecting part, in which the ground connecting part and the power connecting part having electrical wiring that is plated onto the outer bottom surface of the case and conductive through-holes of the case.

2. The magnetic disc apparatus according to claim 1, wherein the case comprises an insulative resin material and is formed as a single unit.

3. The magnetic disc apparatus according to claim 1, wherein the case comprises a metal material which is coated with an insulative material and is formed as a single unit.

4. The magnetic disc apparatus according to claim 1, further comprising:
    a cover that encloses the structure within the case; and
    a seal or a packing that is provided at the junction of the case and the cover to provide hermeticity of the magnetic disc apparatus.

5. A magnetic disc apparatus comprising:
    a magnetic disk;
    a spindle motor that rotationally drives the magnetic disk;
    a magnetic head that records or reproduces information on the magnetic disk;
    a carriage having the magnetic head at its tip;
    a voice coil motor (VCM) that drives the carriage;
    a signal processing circuit that processes signals from the magnetic head;
    a case on which these components are mounted;
    an electrical wiring that interconnects the magnetic head and the signal processing circuit, and/or interconnects the signal processing circuits and is plated onto the inner bottom surface of the case; and
    an interface connecting part that is connected to the electrical wiring and the back surfaces of the case, and is plated onto the outer bottom surface of the case.

6. The magnetic disc apparatus according to claim 5, wherein the case comprises an insulative resin material and is formed as a single unit.

7. The magnetic disc apparatus according to claim 5, wherein the case comprises a metal material which is coated with an insulative material and is formed as a single unit.

8. The magnetic disc apparatus according to claim 5, wherein the interface connecting part comprises a data transmission connecting part, a ground connecting part, and a power connecting part;
    the ground connecting part and the power connecting part having electrical wiring that is plated onto the outer bottom surface of the case and includes conductive through-holes of the case.

9. The magnetic disc apparatus according to claims 5, further comprising:
    a cover that encloses the structure within the case; and
    a seal or a packing that is provided at the junction of the case and the cover to provide hermeticity of the magnetic disc apparatus.

10. A magnetic disc apparatus comprising:
    a magnetic disk;
    a spindle motor that rotationally drives the magnetic disk;
    a magnetic head that records or reproduces information on the magnetic disk;
    a carriage having the magnetic head at its tip;
    a voice coil motor (VCM) that drives the carriage;
    a signal processing circuit that processes signals from the magnetic head;
    a case on which these components are mounted;
    an electrical wiring that interconnects the magnetic head and the signal processing circuit, and/or interconnects the signal processing circuits and is plated onto the inner bottom surface of the case;
    solder joints that directly interconnect the connecting ends of an electric conductor that is connected to the carriage and/or the spindle motor to transfer electric power and control signal, and the connecting ends of the electrical wiring on the inner bottom surface of the case; and an interface connecting part that is connected to the electrical wiring plated onto the inner bottom and the back surfaces of the case, and is plated onto the outer bottom surface of the case.

11. The magnetic disc apparatus according to claim 10, wherein the electric conductor is a flexible printed circuit.

12. The magnetic disc apparatus according to claim 10, wherein the case comprises an insulative resin material and is formed as a single unit.

13. The magnetic disc apparatus according to claim 10, wherein the case comprises a metal material which is coated with an insulative material and is formed as a single unit.

14. The magnetic disc apparatus according to claim 10, wherein the interface connecting part comprises a data transmission connecting part, a ground connecting part, and a power connecting part;

the ground connecting part and the power connecting part having electrical wiring that is plated onto the outer bottom surface of the case and includes conductive through-holes of the case.

15. The magnetic disc apparatus according to claims 10, further comprising;

a cover that encloses the structure within the case;

and a seal or a packing that is provided at the junction of the case and cover to provide hermeticity of the magnetic disc apparatus.

* * * * *